United States Patent
Chou et al.

(10) Patent No.: US 11,455,794 B2
(45) Date of Patent: Sep. 27, 2022

(54) SYSTEM AND METHOD FOR ORCHARD RECOGNITION ON GEOGRAPHIC AREA

(71) Applicant: National Taiwan University, Taipei (TW)

(72) Inventors: Cheng-Ying Chou, Taipei (TW); Yu-Fang Hsieh, Taipei (TW); Yen-Shuo Chen, Taipei (TW); Po-Ting Bertram Liu, Taipei (TW)

(73) Assignee: National Taiwan University, Taipei (TW)

( * ) Notice: Subject to any disclaimer, the term of this patent is extended or adjusted under 35 U.S.C. 154(b) by 167 days.

(21) Appl. No.: 16/923,161

(22) Filed: Jul. 8, 2020

(65) Prior Publication Data
US 2021/0012109 A1    Jan. 14, 2021

Related U.S. Application Data

(60) Provisional application No. 62/871,252, filed on Jul. 8, 2019.

(51) Int. Cl.
*G06V 20/10*    (2022.01)
*G06N 3/04*    (2006.01)
(Continued)

(52) U.S. Cl.
CPC .......... *G06V 20/188* (2022.01); *A01G 17/00* (2013.01); *G06N 3/04* (2013.01); *G06V 10/273* (2022.01)

(58) Field of Classification Search
CPC .... G06V 20/188; G06V 10/273; A01G 17/00; G06N 3/04
See application file for complete search history.

(56) References Cited

U.S. PATENT DOCUMENTS

| 11,100,641 B1 * | 8/2021 | Malahe | G06K 9/6256 |
| 2016/0171680 A1 * | 6/2016 | Lobell | G06T 7/00 |
| | | | 382/110 |

(Continued)

FOREIGN PATENT DOCUMENTS

| AU | 2020103026 A4 * | 12/2020 | |
| WO | WO-2019179269 A1 * | 9/2019 | G01C 21/005 |
| WO | WO-2019227948 A1 * | 12/2019 | A01B 79/005 |

OTHER PUBLICATIONS

Stiller, Dorothee, et al. "Large-scale building extraction in very high-resolution aerial imagery using Mask R-CNN." 2019 Joint Urban Remote Sensing Event (JURSE). IEEE, 2019. (Year: 2019).*

*Primary Examiner* — Utpal D Shah
(74) *Attorney, Agent, or Firm* — Amin, Turocy & Watson, LLP

(57) ABSTRACT

A system and a method for recognition of an orchard on a geographic area are provided. The system includes a pre-processing module for deriving a target section of an aerial image containing a parcel of an orchard, an image optimization module for performing customized image processing on the target section of the aerial image, and a recognition module for determining a type and a border of the orchard present on the target section of the aerial image with a deep learning mechanism. Accordingly, farmers and agricultural entities can effectively monitor orchards within different geographic areas so as to yield better fruit production and conduct better fruit quality control and land utilization.

19 Claims, 11 Drawing Sheets
(1 of 11 Drawing Sheet(s) Filed in Color)

(51) Int. Cl.
*A01G 17/00* (2006.01)
*G06V 10/26* (2022.01)

(56) References Cited

U.S. PATENT DOCUMENTS

| | | | |
|---|---|---|---|
| 2018/0330435 A1* | 11/2018 | Garg | G06Q 30/0283 |
| 2019/0228224 A1* | 7/2019 | Guo | G06V 20/188 |
| 2019/0228225 A1* | 7/2019 | Guo | G06Q 50/02 |
| 2020/0253127 A1* | 8/2020 | McCall | G06V 10/454 |
| 2021/0142559 A1* | 5/2021 | Yousefhussien | G06V 20/188 |
| 2021/0390329 A1* | 12/2021 | Ren | G06V 20/17 |
| 2022/0025863 A1* | 1/2022 | Gollnick | G05B 13/027 |

* cited by examiner

SYSTEM AND METHOD FOR ORCHARD RECOGNITION ON GEOGRAPHIC AREA

CROSS-REFERENCE TO RELATED APPLICATION

This application claims the benefit of U.S. Ser. No. 62/871,252, filed on Jul. 8, 2019, and the disclosure of which is hereby incorporated by reference herein in its entirety.

TECHNICAL FIELD

The present disclosure relates to artificial intelligence agriculture, and more particularly to segmenting a border and determining a type of an orchard on a geographic area.

DESCRIPTION OF RELATED ART

In the agricultural industry, an over-planting or under-planting specific type of fruits often results in a severe imbalance between supply and demands in the market. In order to properly profit from the competitive agricultural industry, it is generally favorable for farmers or agricultural entities being able to monitor orchards within different geographic areas so as to regulate better fruit production and conduct better fruit quality control and land utilization.

Aerial images are common sources for monitoring orchards. However, it is usually difficult to conduct analysis on aerial images since they often contain undesirable interferences such as shadows, clouds or non-fruiter elements such as buildings. Further, even if the aerial images are free of interferences, they are still hard for analysis since the irregular shapes of orchards (e.g., fruiters may be planted along terrains of hills and individual farmers may own irregular shapes of orchards), and similarity of features between different fruiters make them impossible to be differentiated solely by human capabilities.

There may exist efforts made by professional personnel in the art to create shapefiles of orchards in aerial images for easier inspection. However, the efforts may consume a large amount of time and require specific proficiencies in aerial image analysis. For example, one aerial image with a spatial scale ratio of 5000 to 1 that includes only one type of fruiter typically requires twelve hours for professional personnel to fully analyze.

Therefore, there is a need for computer-implemented technique that addresses the aforementioned issues in the art.

SUMMARY

A computer-implemented system for recognizing an orchard on a geographic area is provided, comprising: a pre-processing module configured for deriving a target section of an aerial image containing a parcel of the orchard and a mask corresponding to a shape of the orchard from the aerial image and a shapefile; an image optimization module configured for conditioning the target section of the aerial image by an optimizer; and a recognition module configured for determining a type of the orchard and a border of the orchard within the target section of the aerial image by a deep learning mechanism based on the mask corresponding to the shape of the orchard and the conditioned target section of the aerial image containing the parcel of the orchard.

A computer-implemented method for recognizing an orchard on a geographic area is also provided, comprising: deriving a target section of an aerial image containing a parcel of the orchard from the aerial image and a shapefile; deriving a mask corresponding to a shape of the orchard from the shapefile; conditioning the target section of the aerial image by an optimizer; determining a type of the orchard within the target section of the aerial image by a deep learning mechanism; and determining a border of the orchard within the target section of the aerial image by the deep learning mechanism based on the mask corresponding to the shape of the orchard and the conditioned target section of the aerial image containing the parcel of the orchard.

BRIEF DESCRIPTION OF THE DRAWINGS

The patent application file contains at least one drawing executed in color. Copies of this patent application publication with color drawing(s) will be provided by the Office upon request and payment of the necessary fee.

The present disclosure can be more fully understood by reading the following descriptions of the embodiments, with reference made to the accompanying drawings, wherein.

DETAILED DESCRIPTION OF THE EMBODIMENTS

The present disclosure is described by the following embodiments. Those with ordinary skill in the art can readily understand other advantages and functions of the present disclosure after reading the disclosure of this specification. The present disclosure may also be practiced or applied with other different implementations.

Figure 1:
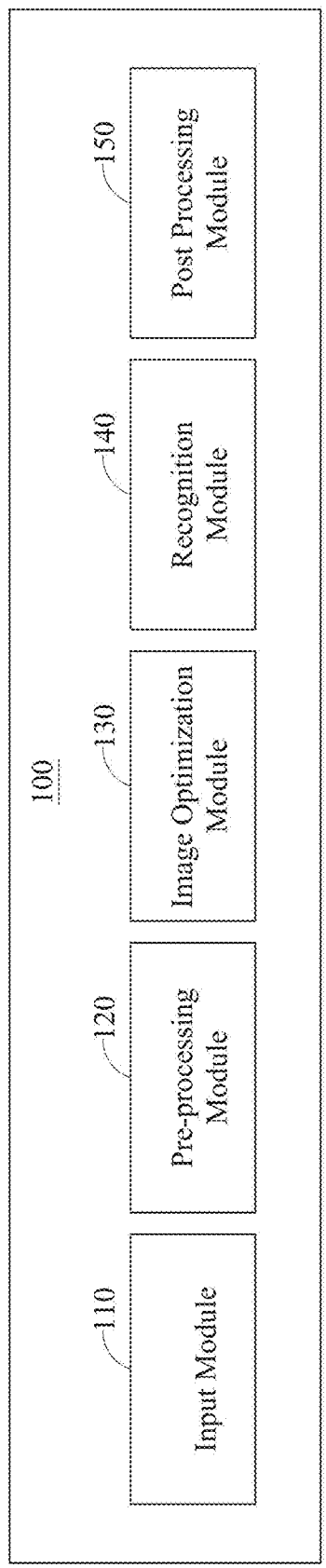
FIG. 1 is a schematic diagram of a system for determining types of orchards on geographic areas of the present disclosure.

Referring to FIG. 1, in which a system 100 for recognizing a type of an orchard on a geographic area is provided. Specifically, the system 100 includes an input module 110, a pre-processing module 120, an image optimization module 130, a recognition module 140 and a post processing module 150. The aforesaid modules may operate on separated or integrated computer devices, processing units or a combination thereof. Further, said modules may be in electrical communication with each other through wired or wireless manner.

The input module 110 is configured for receiving raw images for training and/or analyzing. For example, the system 100 may provide a user interface in form of a webpage or application window to allow upload and/or import of raw images. Although not specified, one of ordinary skill in the art should appreciate that the raw images received by the input module 110 may serve as both training data and data to be identified for orchard recognition in a later stage of the process.

Figure 2:
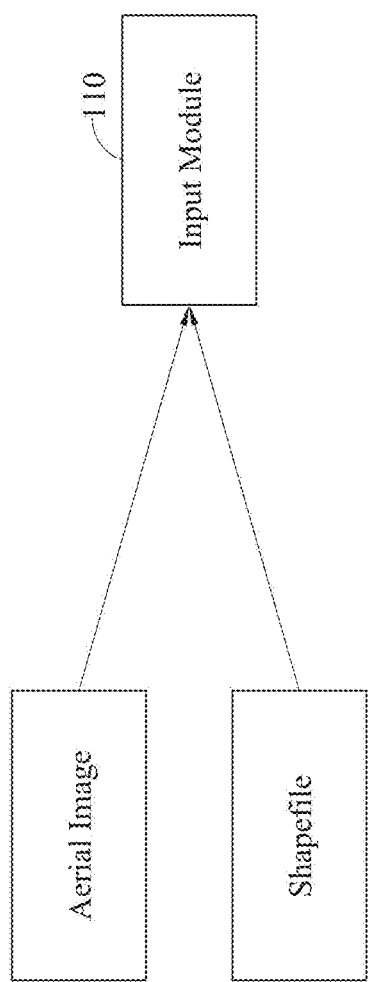
FIGS. 2 to 10 are schematic diagrams of embodiments of the present disclosure.

As shown in FIG. 2, the raw images described herein generally refer to aerial images and shapefiles of orchards, but are not limited thereto.

In the embodiments described herein, the aerial images are images captured by satellites, cameras on aircrafts, drones, or the like, and may be captured in format of multispectral image or hyperspectral image, while the shapefiles may be figures illustrating borders of orchards identified by professionals in the art. Said multispectral image or hyperspectral image may have frequency bands of 7, 12 or 28, but are not limited thereto. Further, the aerial images may contain data existing in RGB (Red, Green and Blue) visible waves, NIR (near infrared) waves, long wavelength infrared waves, panchromatic band waves, and thermal infrared waves and may also contain CAVIS (clouds, aerosols, vapors, ice and snow) information.

In another embodiment, both the aerial images and shapefiles may carry geographical information such as their coordinates and spatial scales with respect to a geographical information system (GIS) or the time when the aerial images and shapefiles are produced. The aerial images and shapefiles may also carry their setting information such as their resolution value, file size, or the like. Such geographical and setting information regarding the aerial images and shapefiles are also beneficial for orchard recognition in later stages.

In yet another embodiment, the aerial images and shapefiles may be uploaded by user on demands, or be imported from reliable sources such as databases of Taiwan Agricultural Research Institute and Forestry Bureau Aerial Survey Office automatically. However, the file formats and sources of raw images are not limited to those mentioned and may be obtained in different file formats or from other sources.

Returning to FIG. 1, the pre-processing module 120 is used to derive a target section of the aerial image and a mask from the aerial images and shapefiles of orchards received by the input module 110. For example, such masks may come from, but not limited to the shapefile. The procedure and results brought about by the pre-processing module 120 are illustrated in FIGS. 3 to 4 and detailed as follows.

Figure 3:
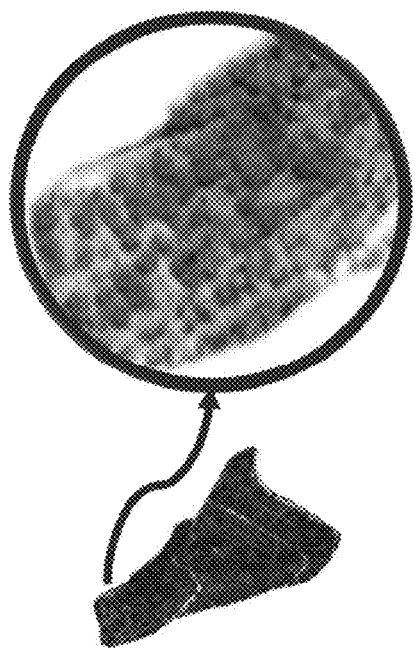
Figure 3:
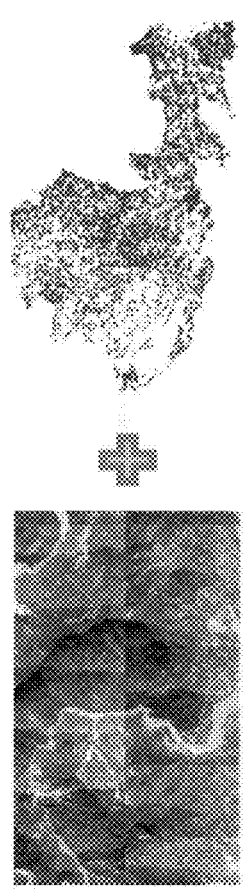

As shown in FIG. 3, parcels of orchards may first be derived by comparing the aerial images and shapefiles of orchards with each other. As illustrated from left to right in FIG. 3 (denoted by an arrow), the pre-processing module 120 selects aerial images and shapefiles having similar geographical information (i.e., close in coordinates and time) for comparison. From here, parcels of orchards (i.e., without background) can be cropped out from aerial images using the border information of orchards described in the shapefiles. It should be appreciated that the obtained parcels of orchards may be used as training information (e.g. ground truth information for parcels of orchards) for orchard recognition in later stages.

In an additional embodiment, after the pre-processing module 120 has derived the parcels of orchards, an additional step may be taken to make sure that the parcels are usable. For example, orchards in fallow season or orchards being used for a construction site may not present any fruiters in aerial images. In another example, aerial images with severe interferences or incompleteness areas may also not present sufficient information about fruiters in the aerial images. In this case, the pre-processing module 120 may filter out any parcels of orchards that have a high non-planting ratio, high color deviation and/or overly small area of orchards. Said non-planting ratio may be calculated by Normalized Difference Vegetation Index (NDVI) value presented in the parcels.

Figure 4:
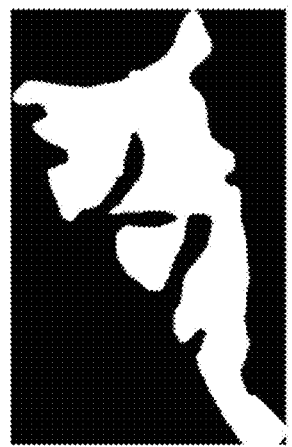
Figure 4:
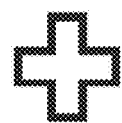
Figure 4:
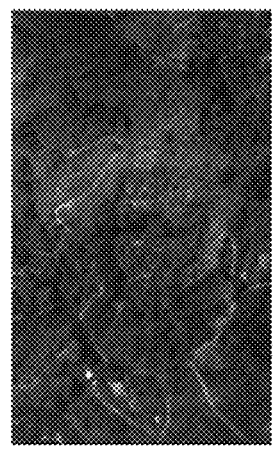
Figure 4:

FIG. 4 is a continuous procedure with respect to FIG. 3, in which the parcels of orchards are used to obtain the target sections of the aerial images. As illustrated from left to right in FIG. 4 (denoted by an arrow), the pre-processing module 120 will segment a target section from the aerial image that contains orchards based on the parcels of orchards (i.e., parcels of orchards with background as shown in the middle image next to the arrow), such that the orchard recognition in later stages may be more manageable (i.e., smaller in file size and having regular shapes). Further, the pre-processing module 120 will also produce a mask corresponding to shape of orchard (i.e., the image shown on the right) using the shapefiles. For example, the masks corresponding to the parcels of orchards will cover the target sections of the aerial image except the regions where orchards are located. In this way, the masks corresponding to the parcels of orchards can detail the borders of orchards (i.e., shapes of the orchards) in the target sections of aerial images. It should be appreciated that the obtained target sections of aerial images and the masks corresponding to the parcels of orchards may be used as training (e.g., ground truth) information for orchard recognition in later stages.

In one embodiment, the masks corresponding to the parcels of orchards may be produced in formats of image masks in PNG/BMP files, Polygon in json or geo-json files, encoded images in json or geo-json files encoded by uncompressed/compressed run-length encoding (RLE) or modified Huffman coding, or the like, but are not limited thereto.

Returning to FIG. 1, the target sections of aerial images (i.e., parcels of orchards with backgrounds) derived by the pre-processing module 120 will be sent to the image optimization module 130 for customized image processing.

For example, the aerial images may be captured with cameras of different settings. As such, the target sections of aerial images segmented from aerial images often contain undesirable flaws and noises, such as cloud, haze, shadows, optical reflections from the earth surface, etc., which are not ideal for recognizing types of orchards (e.g., the fruiters planted in orchards) in aerial images. Therefore, it is desirable to condition the target sections of aerial images into manageable conditions to enable efficient orchard recognition at a later processing stage.

In the embodiments described herein, the image optimization module 130 is configured with a classifier and an optimizer, in which the classifier is configured to determine type of flaws within the target sections of aerial images, while the optimizer is configured to accomplish said conditioning of the target sections of aerial images based on the type of flaws determined by the classifier. For example, the classifier may be a convolutional neural network (CNN) model used for flaw classification within images, such as an AlexNet CNN model, a VGG CNN model, or the like, but is not limited thereto. Moreover, said conditioning of the target sections of aerial images performed by the optimizer may include, but not be limited to, tasks such as cloud/haze removal, color calibration and/or shadow removal for parcels of orchards.

In one embodiment, the task of cloud/haze removal for target sections of aerial images may be achieved by utilizing methods disclosed in the documents "Single Image Haze Removal Using Dark Channel Prior" by Kaiming He, Jian Sun, and Xiaoou Tang, "Single Image Haze Removal using a Generative Adversarial Network" by Bharath Raj N. and Venkateswaran N, "Cloud Removal From Multitemporal Satellite Image Using Information Cloning" by Chao-Hung Lin, Po-Hung Tsai, Kang-Hua Lai and Jyun-Yuan Chen, or the like. However, other techniques for cloud/haze removal for target sections of aerial images with the same or improved efficiency may also be utilized by the image optimization module 130.

In another embodiment, the task of color calibration for target sections of aerial images may be achieved by utilizing methods such as histogram stretching methods from GDAL Cookbook, histogram equalization, PCA-based color correction method by Prof. Ke-Sheng Cheng, image enhancement via global/local contrast optimization and color correction, mid-way equalization, contrast limited adaptive histogram equalization (CLAHE), histogram clipping decorrelation stretching edge-aware local contrast manipulation of images, fast local Laplacian filtering of images, Gamma correction, or the like. However, other techniques for color calibration for target sections of aerial images with the same or improved efficiency may also be utilized by the image optimization module 130.

In yet another embodiment, the task of shadow removal for the target sections of aerial images may be achieved by GAN based on methods disclosed in documents "Stacked Conditional Generative Adversarial Networks for Jointly Learning Shadow Detection and Shadow Removal" by Jifeng Wang, Xiang Li, and Jian Yang, "Conditional GANs for Multi-Illuminant Color Constancy: Revolution or Yet Another Approach?" by Oleksii Sidorov, "Removing Shadows from Images" by Graham D. Finlayson, Steven D. Hordley, and Mark S. Drew, "Single image shadow removal by optimization using non-shadow anchor values" by Saritha Murali, Govindan V. K. and Saidalavi Kalady, or the like. However, other techniques for shadow removal for target sections of aerial images with the same or improved efficiency may also be utilized by the image optimization module 130.

In some alternative embodiments described herein, the optimization module 130 is an optimizer configured with a convolutional neural network (CNN) model, such as a conditional GAN (generative adversarial network) CNN model, or the like, which is capable of performing both flaw classification of aerial images and conditioning of the target sections of aerial images as mentioned above.

Figure 5:
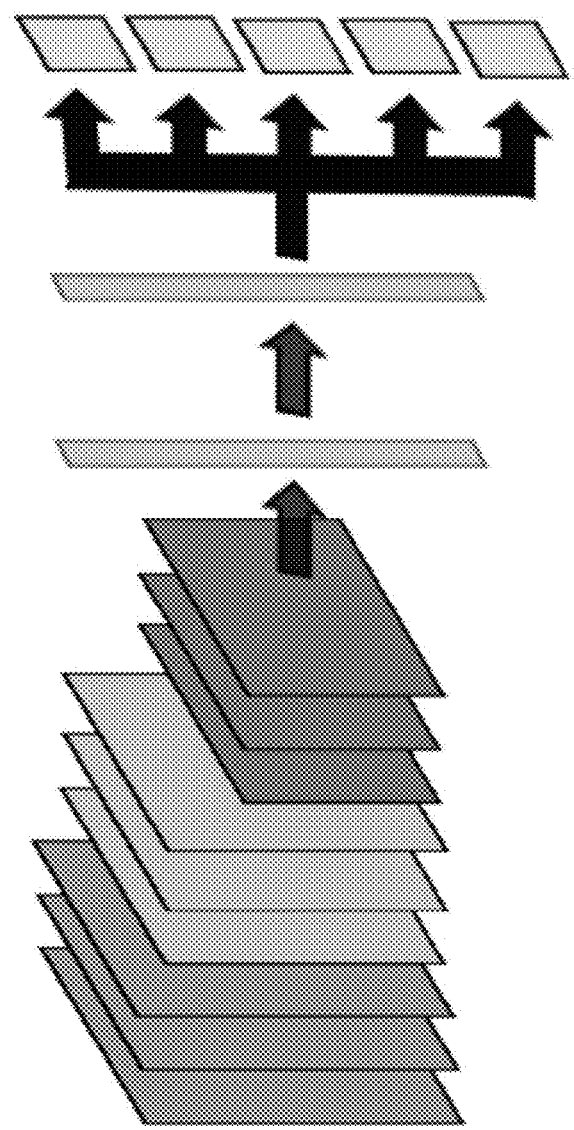

FIG. 5 is an illustrative figure describing the operation of the image optimization module 130, in which the target sections of aerial images may go through a plurality of convolution, pooling and/or fully connected layers to enable feature extracting and classification to perform said tasks of cloud/haze removal, color calibration and shadow removal for target sections of aerial images. It should be appreciated that said tasks of cloud/haze removal, color calibration and shadow removal for target sections of aerial images may be performed by the image optimization module 130 progressively or concurrently, as long as said tasks are achieved efficiently.

Returning to FIG. 1, the recognition module 140 is configured to determine a type of the orchard (i.e., the types of fruiters planted in the orchard) in the target sections of aerial images.

In the embodiments described herein, the recognition module 140 utilizes a deep learning mechanism, such as a neural network, e.g., a convolutional neural network (CNN) model, to recognize orchards. For example, the deep learning mechanism used by the recognition module 140 may be a Mask R-CNN model, but is not limited thereto.

In one embodiment, the deep learning mechanism of the recognition module 140 may be trained using the target sections of aerial images conditioned by the image optimization module 130 and/or the masks corresponding to the parcels of orchards output by the pre-processing module 120 at real time or during training processes. Therefore, the recognition module 140 will automatically identify types of orchards and subsequently identify borders of orchards (i.e., shape of orchards) in unidentified aerial images once they are received.

Figure 6:
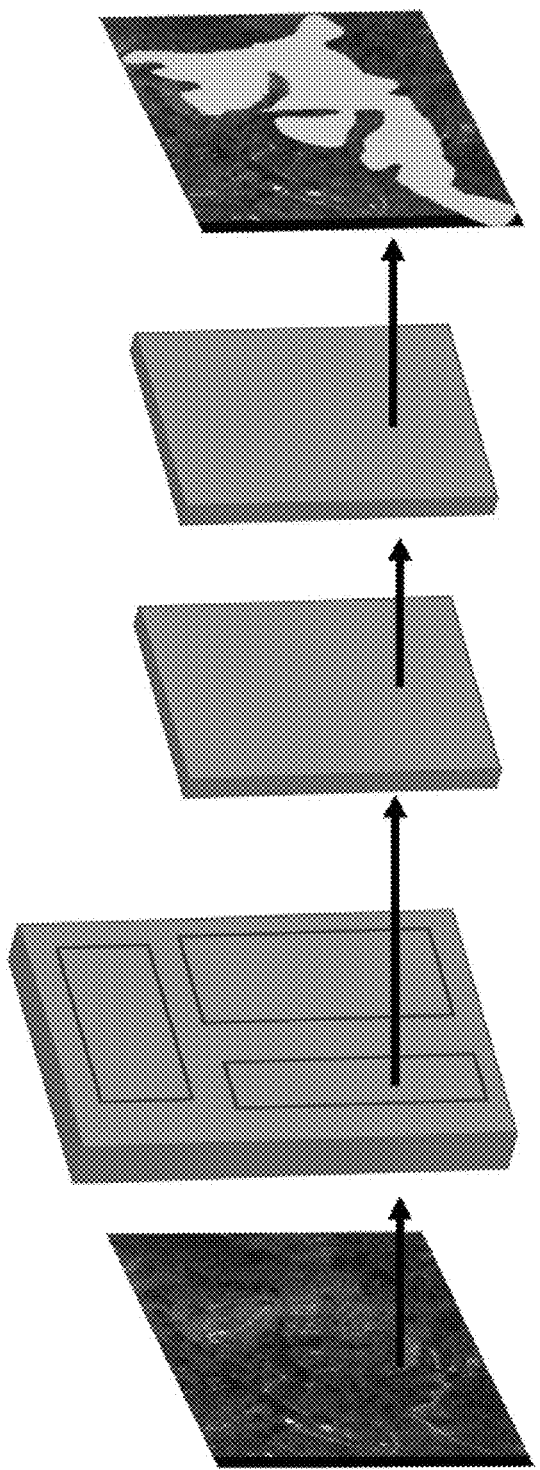

FIG. 6 illustrates procedures of determining a type of an orchard using the deep learning mechanism of the recognition module 140, which are presented in a direction from left to right as shown by the arrows. First, a Region Proposal Network is used to identify region of interests (ROIs) on a target section of an aerial image, in which the ROIs are typically quadrilateral-shaped bounding boxes that contain orchards to be identified. Then, the ROIs go through a series of Fully Convolutional Networks (e.g., the two Fully Convolutional Networks shown in FIG. 6) to determine and identify the type of fruiters planted in the orchard (i.e., types of the orchards), and produce a mask that crops out a border shape of the orchard on the target section of aerial image so as to mark a border of the orchard.

There are several criteria to identify fruiters from aerial images. For example, for a growing characteristic aspect, banana trees typically have star-shaped canopies with multiple large-size leaves; jujube trees typically have ciliated canopies in translucent layers; and wax apple trees typically have rounded canopies in bright green color. In another example, for an agricultural operation aspect, jujube trees are often covered in white nets before harvest seasons; the canopies of litchi trees are constantly pruned (e.g., having hollow parts in the middle of the canopies of litchi trees) to control their heights; and wax apple trees are often covered with black nets to control their fruit bearing time. These characteristics of fruiters hence form criteria to identify fruiters within orchards from aerial images.

Therefore, the recognition module 140 can be trained to automatically identify types of fruiters planted in the orchards within the ROIs by extracting features in target sections of aerial images that match the criteria mentioned above. However, it should be appreciated that the recognition module 140 are not limited for identifying only the types of fruiters mentioned above. In fact, the recognition module 140 may be trained to identify even more types of fruiters as long as criteria for identifying other types of orchards are updated to the deep learning mechanism of the recognition module 140 constantly.

Figure 7:
Figure 7:
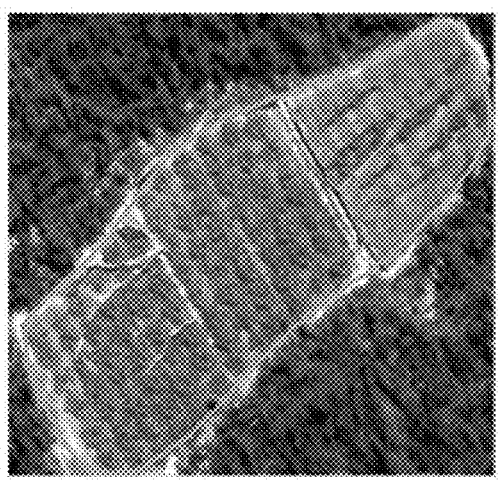
Figure 7:
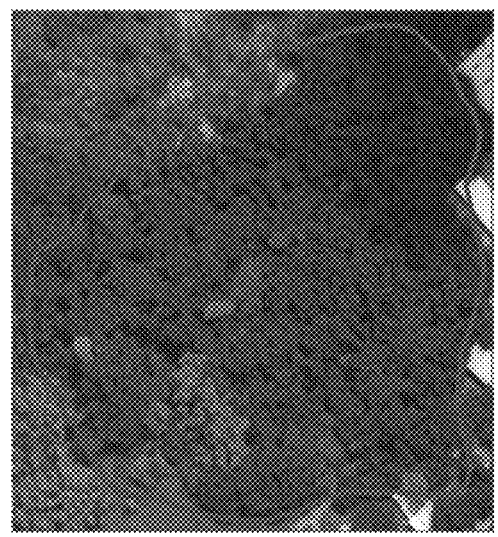
Figure 8:
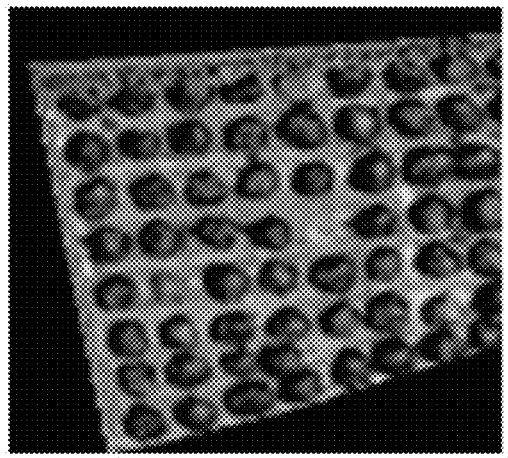
Figure 8:
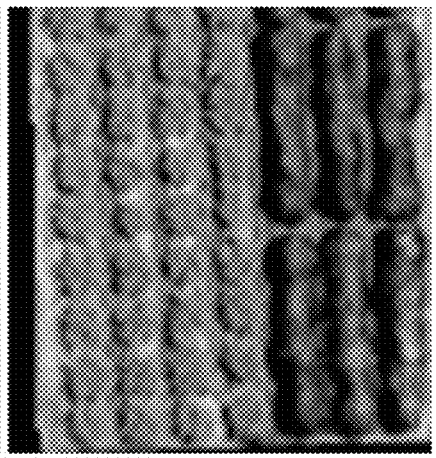
Figure 8:
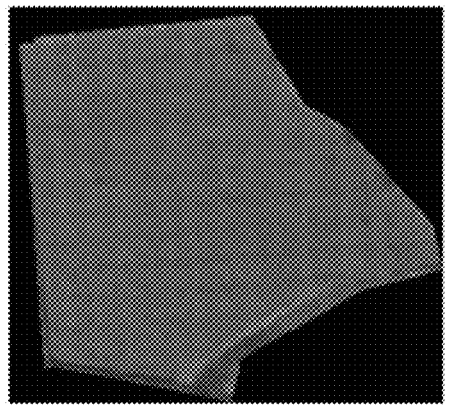
Figure 8:
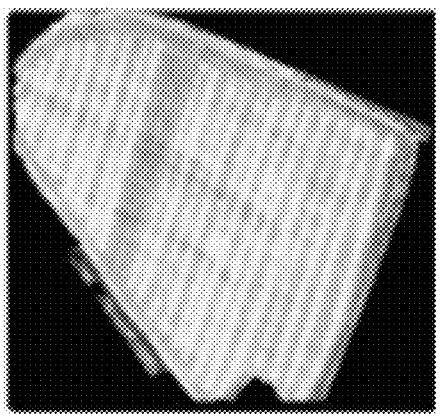

FIGS. 7 and 8 show examples of orchards being recognized by the recognition module 140. In FIG. 7, the ROIs being identified output as images labeled with type of fruiters (namely, Wax apple, Jujube, and Litchi) and marked with the borders of orchards (presented as thick lines that wrapped around the orchards). FIG. 8 shows another example of identifying orchards in ROIs based on features of agricultural operations, such as orchards of jujube tress covered in white net and wax apple trees covered in black nets. It is noted that the type of fruiters may include pear, persimmon, bamboo, longan, carambola, grape, betel pepper, banana, apple, mango, loquat, coconut, peach/plum, dragon fruit, Annona squamosa, guava, papaya, passion fruit, leucaena, sugarcane.

Returning to FIG. 1, the post processing module 150 is configured for outputting the recognition results from the recognition module 140. For example, an image with recognized orchard may be projected onto the aerial image containing the orchard for demonstration.

Figure 9:
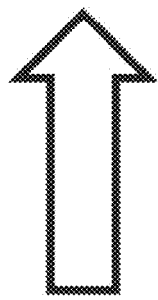
Figure 9:
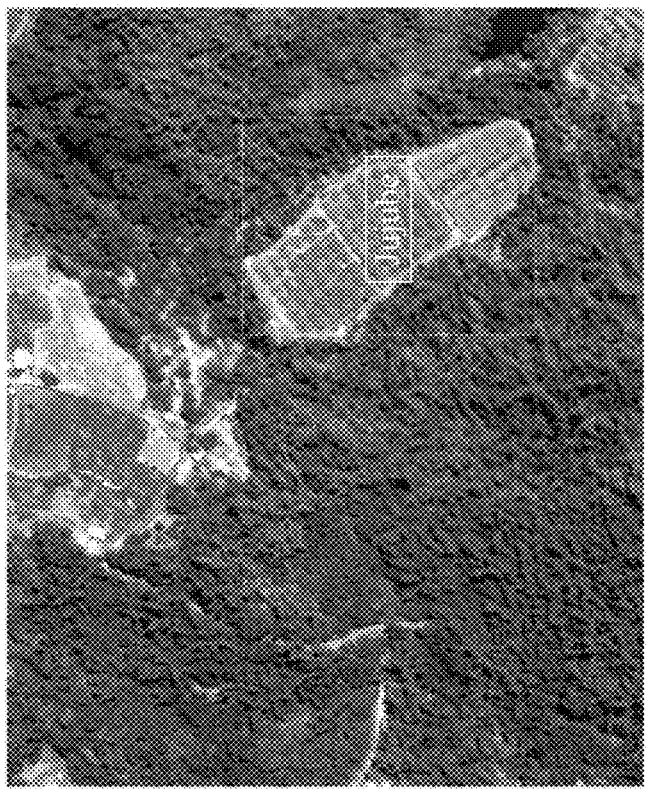
Figure 10:
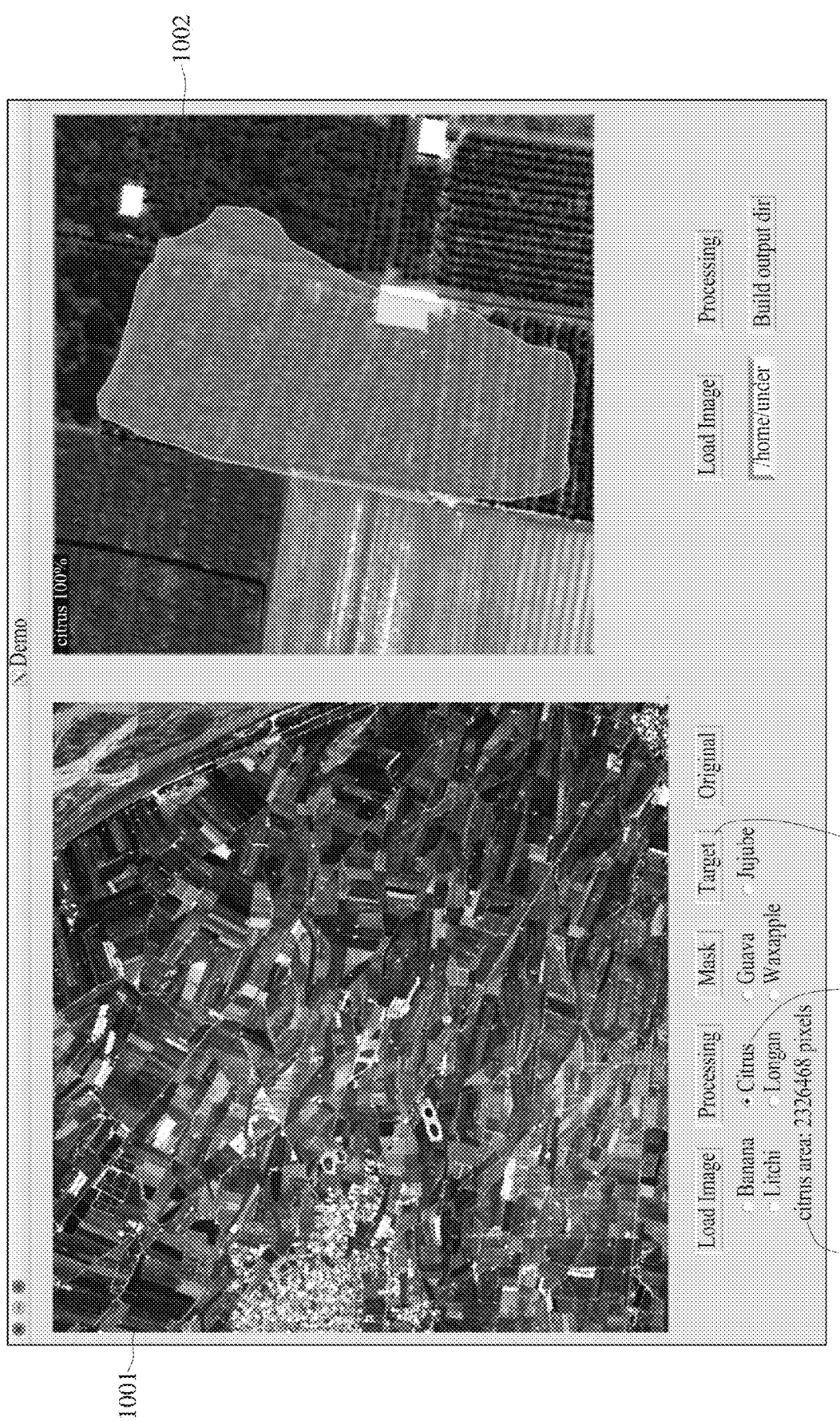

FIGS. 9 to 10 show the working procedure of the post processing module 150. In FIG. 9, the post processing module 150 searches for location on an aerial image uploaded by the user that corresponds to images of identified orchards (e.g., using the geographical information of the aerial images). Moving on to FIG. 10, the post processing module 150 may present the aerial image, along with the corresponding image of identified orchards, in a user interface for a viewing option. Similarly, the user interface may be in form of a webpage or application window and may be the same user interface used for inputting raw images to the input module 110 provided by the system 100.

FIG. 10 illustrates an example of a user interface presenting the recognition result output by the post processing module 150 in accordance with the embodiments described herein. In this embodiment, under a request to show the recognition result of orchards planted with citrus from an aerial image, a target 1003 option and a citrus 1004 option may be selected by a user to mark out all orchards planted with citrus shown in a left window 1001 that presents the aerial image. Then, when the user selects to view a particular orchard on the aerial image (e.g., hover the mouse cursor over a particular orchard in the aerial image), an image of the selected orchard may be presented on the right window 1002 (i.e., an image with the recognized orchard), with a pattern layer (which corresponds to the border/shape of the orchard marked by the mask) marking the region of the orchard presented in the image of the selected orchard. Optionally, additional information such as a citrus area 1005 (in units of pixels) in the orchard may also be presented, such that the user can obtain actual geographical information of the orchard identified (e.g., an actual planting area of the orchard) therefrom.

Figure 11:
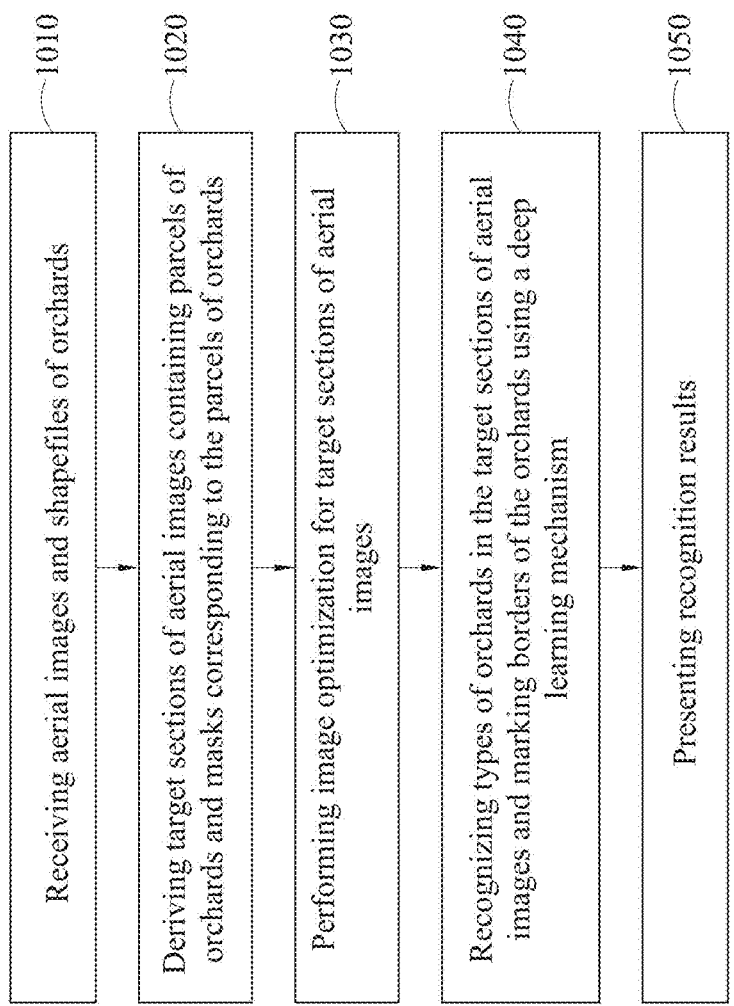
FIG. 11 is a flow chart illustrating steps for operating the system for determining types of orchards on geographic areas of the present disclosure.

FIG. 11 shows a flow chart of a method for recognizing orchards in aerial images.

In step 1010, aerial images and shapefiles of orchards are received. For example, the aerial images and shapefiles of orchards may be uploaded through a user interface (e.g., a webpage, an application window, etc.) provided by the system 100 to the input module 110. In this case, the aerial images may contain one or more orchards that are to be recognized.

In step 1020, the aerial images are pre-processed by the pre-processing module 120 to produce target sections of aerial images containing parcels of orchards from the aerial images and to produce masks corresponding to the parcels of orchards using the shapefiles of orchards.

In step 1030, the target sections of aerial images may be conditioned by the image optimization module 130, in which the image optimization module 130 is an optimizer that configured for determining type of flaws in the target sections of aerial images and performing tasks such as cloud/haze removal, color calibration and shadow removal for the target sections of aerial images based on the type of flaws.

In step 1040, orchards in the target sections of aerial images are recognized by the deep learning mechanism. For example, a type of the orchard and a border of the orchard in the target sections of aerial images are determined through the deep learning mechanism of the recognition module 140 based on the masks corresponding to the parcels of orchards produced by the pre-processing module 120 and various criteria for identifying fruiters.

In step 1050, the recognition results are post-processed. For example, images marked with the type and borders of orchards (as shown in FIGS. 7 and 8), along with their corresponding aerial images, may be used to present the recognition result on the user interface provided by the system 100 via the post processing module 150.

In the system and method for recognizing an orchard on a geographic area according to the present disclosure, a pre-processing module is used to derive a target section of the aerial image containing a parcel of an orchard from an aerial image; an image optimization module is used to perform customized image processing on the target sections of the aerial image; and a recognition module is used to determine types and borders of orchards present on the aerial images with a deep learning mechanism. Accordingly, farmers and agricultural entities may apply the present disclosure to effectively monitor orchards within different geographic areas so as to yield better fruit production and conduct better fruit quality control and land utilization.

The foregoing descriptions of the embodiments are illustrated to disclose the features and functions of the present disclosure and not restrictive of the scope of the present disclosure. It should be understood to those in the art that all modifications and variations according to the spirit and principle in the present disclosure should fall within the scope of the appended claims.

What is claimed is:

1. A computer-implemented system for recognizing an orchard on a geographic area, the computer-implemented system having a processor by which programs executed causing the system to perform:
   deriving a target section of an aerial image containing a parcel of the orchard and a mask corresponding to a shape of the orchard from the aerial image and a shapefile;
   conditioning the target section of the aerial image; and
   determining a type of the orchard within the target section of the aerial image by a deep learning mechanism based on at least one of fruiters growing characteristic and agricultural operation characteristic, and determining a border of the orchard within the target section of the aerial image by the deep learning mechanism based on the mask corresponding to the shape of the orchard and the conditioned target section of the aerial image containing the parcel of the orchard.

2. The computer-implemented system of claim 1, wherein the border of the orchard winds along the orchard.

3. The computer-implemented system of claim 1, wherein conditioning the target section of the aerial image further comprises:
   determining type of flaws in the target section of the aerial image with a classifier; and
   performing at least one of cloud and haze removal, color calibration, image modulating and shadow removal on the target section based on the type of flaws with an optimizer.

4. The computer-implemented system of claim 1, wherein the deep learning mechanism determines the type of the orchard and the border of the orchard within the target section of the aerial image by:
   identifying a region of interest containing the orchard in the target section of the aerial image;
   recognizing fruiters planted within the orchard in the region of interest to determine the type of the orchard;
   generating a mask for the region of interest to segment the border of the orchard, the mask marking a border shape of the orchard in the region of interest; and
   outputting an image marked with the type and the border of the orchard.

5. The computer-implemented system of claim 4, wherein the programs executed by the processor further cause the system to perform: presenting the image marked with the type and the border of the orchard onto a user interface.

6. The computer-implemented system of claim 1, wherein deriving the target section of the aerial image containing the parcel of the orchard and the mask corresponding to the shape of the orchard from the aerial image and the shapefile further comprises:
   generating the parcel of the orchard by comparing the aerial image to the shapefile of the orchard, the shapefile having shape information of the orchard;
   segmenting the aerial image to produce the target section of the aerial image containing the parcel of the orchard; and generating the mask corresponding to the shape of the orchard using the shapefile of the orchard.

7. The computer-implemented system of claim 6, wherein at least one of the parcel of the orchard and the mask corresponding to the shape of the orchard act as training data for the deep learning mechanism.

8. The computer-implemented system of claim 7, wherein the deep learning mechanism is trained to determine the type of the orchard by extracting a feature in the aerial image corresponding to a characteristic of fruiters planted within the border of the orchard.

9. The computer-implemented system of claim 1, wherein the programs executed by the processor further cause the system to perform: receiving the aerial image and the shapefile.

10. The computer-implemented system of claim 1, wherein the programs executed by the processor further cause the system to:
classify type of flaws in the target section of the aerial image; and
perform at least one of cloud and haze removal, color calibration, image modulating and shadow removal on the target section based on the type of flaws.

11. A computer-implemented method for recognizing an orchard on a geographic area, comprising:
deriving a target section of an aerial image containing a parcel of the orchard from the aerial image and a shapefile;
deriving a mask corresponding to a shape of the orchard from the shapefile;
conditioning the target section of the aerial image; and
determining a type of the orchard within the target section of the aerial image by a deep learning mechanism based on at least one of fruiters growing characteristic and agricultural operation characteristic; and
determining a border of the orchard within the target section of the aerial image by the deep learning mechanism based on the mask corresponding to the shape of the orchard and the conditioned target section of the aerial image containing the parcel of the orchard.

12. The computer-implemented method of claim 11, wherein the border of the orchard winds along the orchard.

13. The computer-implemented method of claim 11, wherein conditioning the target section of the aerial image comprises:
determining type of flaws in the target section of the aerial image with a classifier; and
performing at least one of cloud and haze removal, color calibration, image modulating and shadow removal on the target section of the aerial image based on the type of flaws with an optimizer.

14. The computer-implemented method of claim 11, wherein determining the type of the orchard within the target section of the aerial image by the deep learning mechanism comprises:
identifying a region of interest containing the orchard in the target section of the aerial image; and
extracting a feature in the target section of the aerial image corresponding to a characteristic of a fruiter planted within the orchard.

15. The computer-implemented method of claim 14, wherein determining the border of the orchard by the deep learning mechanical comprises:
generating a mask for the region of interest to segment the border of the orchard, the mask marking a border shape of the orchard in the region of interest.

16. The computer-implemented method of claim 11, wherein deriving the target section of the aerial image containing the parcel of the orchard from the aerial image and the shapefile comprises:
generating the parcel of the orchard by comparing the aerial image to the shapefile of the orchard, the shapefile having shape information of the orchard; and
segmenting the aerial image to produce the target section of the aerial image containing the parcel of the orchard.

17. The computer-implemented method of claim 16, wherein deriving the mask corresponding to the shape of the orchard from the shapefile comprises:
generating the mask corresponding to the shape of the orchard using the shapefile of the orchard.

18. The computer-implemented method of claim 11, further comprising:
outputting an image marked with the type and the border of the orchard; and
presenting the image marked with the type and the border of the orchard and the aerial image onto a user interface.

19. The computer-implemented method of claim 11, wherein the deep learning mechanism is a Mask R-CNN model.

* * * * *